United States Patent

Adam et al.

[11] Patent Number: 5,859,216
[45] Date of Patent: Jan. 12, 1999

[54] ANIONIC ACID DYES, PROCESSES FOR THEIR PREPERATION AND THEIR USE

[75] Inventors: Jean-Marie Adam, Rosenau; Jean-Pierre Bacher, Buschwiller, both of France

[73] Assignee: Ciba Specialty Chemicals Corporation, Tarrytown, N.Y.

[21] Appl. No.: 811,450

[22] Filed: Mar. 3, 1997

[51] Int. Cl.$^6$ .................................................. C09B 43/16
[52] U.S. Cl. .................... 534/776; 535/797; 535/803; 544/187; 544/189; 8/677
[58] Field of Search ................... 534/776, 797, 534/803; 544/187, 189; 8/677

[56] References Cited

U.S. PATENT DOCUMENTS

| | | | |
|---|---|---|---|
| 4,670,547 | 6/1987 | Lehr | 534/637 |
| 4,742,160 | 5/1988 | Doré et al. | 534/605 |
| 4,764,175 | 8/1988 | Doré et al. | 534/803 X |
| 4,968,784 | 11/1990 | Imai et al. | 534/803 X |
| 4,975,118 | 12/1990 | Moyer et al. | 106/22 |
| 5,625,041 | 4/1997 | Johnson et al. | 530/416 |
| 5,637,679 | 6/1997 | Hassenrück et al. | 534/691 |
| 5,667,571 | 9/1997 | Ono et al. | 534/797 X |

FOREIGN PATENT DOCUMENTS

| | | |
|---|---|---|
| 0098430 | 1/1984 | European Pat. Off. . |
| 0190586 | 8/1986 | European Pat. Off. . |
| 0290384 | 12/1992 | European Pat. Off. . |
| 0692523 | 1/1996 | European Pat. Off. . |
| 2158837 | 11/1985 | United Kingdom . |
| 2179361 | 3/1987 | United Kingdom . |

OTHER PUBLICATIONS

Derwent Abstr. No. 86–205512 [32] for EP 0190586, Aug. 1986.
Derwent Abstr. No. 84–012233 [03] for EP 0098430, Jan. 1984.
Dyes & Pigments, vol. 28, No. 3, pp. 171–192, 1995.
JSDC, vol. 111, Jan./Feb. 1995, pp. 12–18.
JSDC, vol. 108, Sep. 1992, pp. 383–387.
Derwent Abst. 1995: 678 701.
Derwent Abst. 88–316608 [45] (for EP 290,384), Dec. 1992.
Chevrie et al, Biochemie (1994), 76, 171–179.
Santambien et al., J. Chromatography, 597 (1992), 315–322.

*Primary Examiner*—Fiona T. Powers
*Attorney, Agent, or Firm*—David R. Crichton

[57] ABSTRACT

Anionic acid dyes of the formula

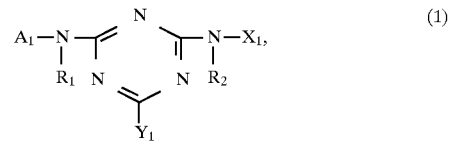

(1)

in which $R_1$ and $R_2$ independently of one another are hydrogen or substituted or unsubstituted $C_1$–$C_4$alkyl, $X_1$ is $C_1$–$C_8$alkyl, substituted or unsubstituted $C_5$–$C_7$cycloalkyl, phenyl or naphthyl which are unsubstituted or substituted by $C_1$–$C_4$alkyl, $C_1$–$C_4$alkoxy, $C_2$–$C_4$alkanoylamino, amino, hydroxyl, ureido, halogen, carboxyl or sulfo, or the radical of the formula —N($R_2$)—$X_1$ is a ring, which may contain further heteroatoms, $Y_1$ is a radical of the formula

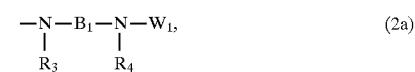

(2a)

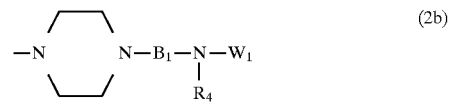

(2b)

or

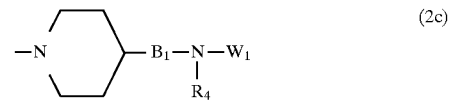

(2c)

in which $B_1$ is a colourless organic bridge member, $R_3$ is hydrogen or $C_1$–$C_4$alkyl and $R_4$ is hydrogen or substituted or unsubstituted $C_1$–$C_4$alkyl, $W_1$ is hydrogen or a radical of the formula —CO—R, in which R is substituted or unsubstituted $C_1$–$C_8$alkyl, $C_5$–$C_7$cycloalkyl, phenyl or naphthyl and $A_1$ is as defined in claim 1.

The dyes of the formula (1) are particularly suitable for dyeing or printing natural or synthetic polyamide fibre materials.

13 Claims, No Drawings

ANIONIC ACID DYES, PROCESSES FOR THEIR PREPERATION AND THEIR USE

The present invention relates to novel anionic acid dyes, to processes for their preparation and to use of these dyes for dyeing and printing fibre materials, in particular textile fibre materials.

The present invention relates to anionic acid dyes of the formula

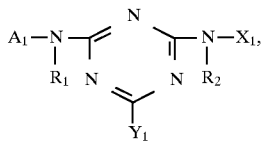

in which $R_1$ and $R_2$ independently of one another are hydrogen or substituted or unsubstituted $C_1$–$C_4$alkyl, $X_1$ is $C_1$–$C_8$alkyl, substituted or unsubstituted $C_5$–$C_7$cycloalkyl, phenyl or naphthyl which are unsubstituted or substituted by $C_1$–$C_4$alkyl, $C_1$–$C_4$alkoxy, $C_2$–$C_4$alkanoylamino, amino, hydroxyl, ureido, halogen, carboxyl or sulfo, or the radical of the formula —N($R_2$)—$X_1$ is a ring, which may contain further heteroatoms, $Y_1$ is a radical of the formula

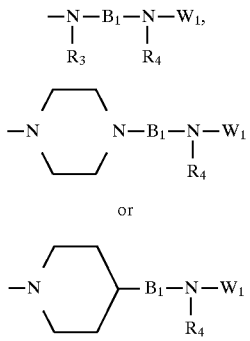

in which $B_1$ is a colourless organic bridge member, $R_3$ is hydrogen or $C_1$–$C_4$alkyl and $R_4$ is hydrogen or substituted or unsubstituted $C_1$–$C_4$alkyl, $W_1$ is hydrogen or a radical of the formula —CO—R, in which R is substituted or unsubstituted $C_1$–$C_8$alkyl, $C_5$–$C_7$cycloalkyl, phenyl or naphthyl and $A_1$ is the radical of a monoazo dye of the formula

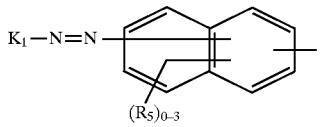

in which $K_1$ is a radical of the benzene or naphthalene series or a heterocyclic radical and $(R_5)_{0-3}$ is 0 to 3 identical or different substituents chosen from the group consisting of $C_1$–$C_4$alkyl, $C_1$–$C_4$alkoxy, $C_2$–$C_4$alkanoylamino, ureido, halogen, carboxyl and sulfo, or $A_1$ is the radical of a polyazo, metal complex azo, anthraquinone, formazan, phthalocyanine or dioxazine dye.

$C_1$–$C_4$alkyl $R_1$, $R_2$ and $R_4$ independently of one another are suitably, for example, methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. Preferred alkyl radicals are the corresponding unsubstituted radicals.

$C_1$–$C_4$alkyl $R_3$ and $R_5$ is suitably, for example, methyl, ethyl, propyl, isopropyl, butyl, sec-butyl, tert-butyl or isobutyl.

$C_1$–$C_8$alkyl $X_1$ and R independently of one another are suitably preferably $C_1$–$C_4$alkyl radicals, for example methyl, ethyl, propyl, isopropyl, butyl, sec-butyl, tert-butyl or isobutyl. The alkyl radicals R mentioned can be unsubstituted or substituted, for example by hydroxyl, sulfo, sulfato, cyano or carboxyl. The unsubstituted radicals R are preferred here.

$C_1$–$C_4$alkoxy $R_5$ is suitably, for example, methoxy, ethoxy, propoxy, isopropoxy, butoxy or isobutoxy, in particular methoxy.

$C_2$–$C_4$alkanoylamino $R_5$ is suitably, in particular, acetylamino or propionylamino, preferably acetylamino.

Halogen $R_5$ is suitably, for example, fluorine, chlorine or bromine, in particular chlorine.

A ring which may contain further heteroatoms for the radical of the formula —N($R_2$)—$X_1$ is suitably, for example, morpholino.

$C_5$–$C_7$cycloalkyl $X_1$ and R is suitably, in particular, the cyclohexyl radical. The cycloalkyl radicals mentioned can be unsubstituted or substituted, for example by $C_1$–$C_4$alkyl, in particular by methyl.

Phenyl or naphthyl R are suitably, in addition to the corresponding unsubstituted radicals, the radicals substituted, for example, by $C_1$–$C_4$alkyl, $C_1$–$C_4$alkoxy, $C_2$–$C_4$alkanoylamino, amino, hydroxyl, ureido, halogen, carboxyl or sulfo.

A colourless organic bridge member $B_1$ is, for example, substituted or unsubstituted $C_1$–$C_{12}$alkylene, which can be interrupted by 1, 2 or 3 members from the group consisting of —NH—, —N(CH$_3$)— and —O—, or substituted or unsubstituted $C_5$–$C_7$Cycloalkylene, phenylene or naphthylene. $C_5$–$C_7$cycloalkylene here is suitably, in particular, cyclohexylene, which can be unsubstituted or substituted, for example by $C_1$–$C_4$alkyl, in particular by methyl. Substituents here of the phenylene and naphthylene radicals mentioned are suitably, for example, $C_1$–$C_4$alkyl, $C_1$–$C_4$alkoxy, $C_2$–$C_4$alkanoylamino, amino, hydroxyl, ureido, halogen, carboxyl or sulfo, in particular $C_1$–$C_4$alkyl, $C_1$–$C_4$alkoxy, halogen or sulfo. Substituents of the $C_1$–$C_{12}$alkylene radicals mentioned are suitably, for example, hydroxyl, sulfo, sulfato, cyano or carboxyl. The $C_1$–$C_{12}$-alkylene radicals are preferably unsubstituted.

$R_1$ and $R_2$ are preferably independently of one another hydrogen or $C_1$–$C_4$alkyl. $R_1$ is particularly preferably hydrogen, methyl or ethyl, in particular hydrogen. $R_2$ is particularly preferably $C_1$–$C_4$alkyl, in particular methyl or ethyl, and preferably ethyl.

$(R_5)_{0-3}$ is preferably 0 to 3 identical or different substituents chosen from the group consisting of $C_1$–$C_4$alkyl, $C_1$–$C_4$alkoxy, halogen and sulfo. The radicals of the formula (3) preferably contain only one substituent $R_5$, which is hydrogen or sulfo, in particular sulfo.

$X_1$ is preferably $C_1$–$C_8$alkyl, $C_5$–$C_7$-cycloalkyl which is unsubstituted or substituted by $C_1$–$C_4$alkyl, or phenyl or naphthyl which are unsubstituted or substituted by $C_1$–$C_4$alkyl, $C_1$–$C_4$alkoxy, $C_2$–$C_4$alkanoylamino, ureido, halogen, carboxyl or sulfo. The phenyl radical, which can be substituted as defined above, is particularly preferred here. $X_1$ is particularly preferably phenyl which is unsubstituted or substituted by $C_1$–$C_4$alkyl, $C_1$–$C_4$alkoxy, halogen or sulfo, preferably unsubstituted phenyl. $R_2$ here is particularly preferably $C_1$–$C_4$alkyl, in particular methyl or ethyl and preferably ethyl.

$B_1$ is preferably a $C_1$–$C_{12}$alkylene radical, in particular a $C_1$–$C_{10}$alkylene radical, which can be interrupted by 1, 2 or 3 members from the group consisting of —NH—, —N(CH$_3$)— and, in particular, —O—, and is unsubstituted or substituted by hydroxyl, sulfo, sulfato, cyano or carboxyl. The corresponding unsubstituted alkylene radicals are of particular interest here.

$B_1$ is particularly preferably a $C_1$–$C_{10}$alkylene radical, in particular a $C_1$–$C_6$alkylene radical, and preferably a $C_1$–$C_4$alkylene radical. Particularly interesting radicals $B_1$ are those of the formulae —CH$_2$—, —CH$_2$CH$_2$— and —CH$_2$CH$_2$CH$_2$—.

$R_3$ is preferably hydrogen.

$R_4$ is preferably hydrogen or $C_1$–$C_4$alkyl which is unsubstituted or substituted by hydroxyl, sulfo, sulfato, cyano or carboxyl, preferably hydrogen or $C_1$–$C_4$alkyl, and in particular hydrogen.

R is preferably phenyl which is unsubstituted or substituted by $C_1$–$C_4$alkyl, $C_1$–$C_4$alkoxy, halogen, carboxyl or sulfo, or in particular $C_1$–$C_8$alkyl. R is particularly preferably $C_1$–$C_4$alkyl, in particular methyl or ethyl, and preferably methyl.

$W_1$ is preferably hydrogen or a radical of the formula —CO—R, in which R is as defined and preferred above. In particular, R here is $C_1$–$C_8$alkyl, or phenyl which is unsubstituted or substituted by $C_1$–$C_4$alkyl, $C_1$–$C_4$alkoxy, halogen, carboxyl or sulfo, preferably $C_1$–$C_8$alkyl. $W_1$ is particularly preferably hydrogen.

The radical $Y_1$ is preferably a radical of the formula (2a), or (2b), in particular a radical of the formula (2a).

Preferred dyes of the formula (1) are those in which
$R_1$ and $R_4$ independently of one another are hydrogen or $C_1$–$C_4$alkyl,
$R_2$ is hydrogen or $C_1$–$C_4$alkyl, in particular $C_1$–$C_4$alkyl,
$X_1$ is phenyl which is unsubstituted or substituted by $C_1$–$C_4$alkyl, $C_1$–$C_4$alkoxy, $C_2$–$C_4$alkanoylamino, ureido, halogen, carboxyl or sulfo, preferably phenyl,
$B_1$ is a $C_1$–$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl and
$W_1$ is hydrogen or a radical of the formula —CO—R, in particular hydrogen.

The radical of the formula (3) is preferably a radical of the formula

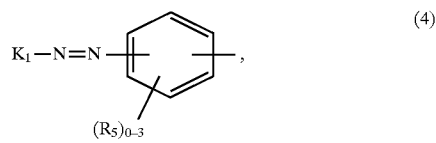

(4)

in which $K_1$ and $(R_5)_{0-3}$ are as defined and preferred above.

The radical $K_1$ is preferably a benzene, naphthalene, 6-hydroxypyrid-2-one, 1-phenyl-5-aminopyrazole, 1-phenylpyrazol-5-one or indole radical, in particular a benzene, naphthalene, 1-phenyl-5-aminopyrazole or 1-phenylpyrazol-5-one radical, and preferably a naphthalene, 1-phenyl-5-aminopyrazole or 1-phenylpyrazol-5-one radical.

Examples of substituents of the radical $K_1$ are the following:

$C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, such as methoxy, ethoxy, propoxy, isopropoxy, butoxy, isobutoxy, sec-butoxy or tert-butoxy; $C_2$–$C_6$-alkanoylamino, in particular $C_2$–$C_4$-alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$–$C_4$alkylamino. In this case, the phenyl radicals mentioned can be unsubstituted or substituted, for example by $C_1$–$C_4$alkyl, $C_1$–$C_4$alkoxy, $C_2$–$C_4$-alkanoylamino, ureido, halogen, carboxyl or sulfo.

Particularly preferably, $K_1$ is a radical of the formula

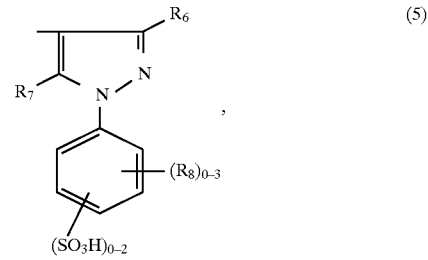

(5)

in which $R_6$ is methyl or carboxyl,
$R_7$ is amino or hydroxyl and
$(R_8)_{0-3}$ is 0 to 3 identical or different substituents chosen from the group consisting of $C_1$–$C_4$alkyl, $C_1$–$C_4$alkoxy, $C_2$–$C_4$alkanoylamino, ureido, halogen, carboxyl and sulfo, or
$K_1$ is a radical of the formula

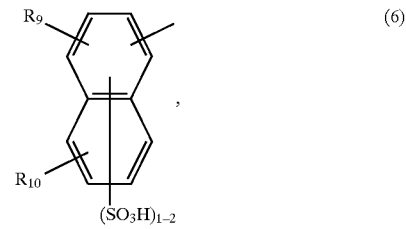

(6)

in which $R_9$ is hydrogen, amino or N-mono- or N,N-di-$C_1$–$C_4$alkylamino and
$R_{10}$ is hydrogen or hydroxyl.

$R_6$ is preferably methyl.

$(R_8)_{0-3}$ is preferably 0 to 3 identical or different substituents chosen from the group consisting of $C_1$–$C_4$alkyl, $C_1$–$C_4$alkoxy, halogen and sulfo.

$R_9$ is preferably amino or N-mono- or N,N-di-$C_1$–$C_4$alkylamino, in particular amino.

$R_{10}$ is preferably hydrogen.

The radicals of the formula (6) preferably contain only one sulfo group.

Preferred radicals $K_1$ of the formula (6) are those of the formula

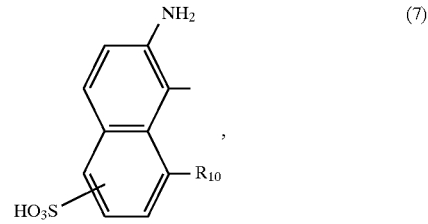

(7)

in which $R_{10}$ is hydrogen or hydroxyl, in particular hydrogen.

The radical $A_1$ in the dye of the formula (1), as a radical of a polyazo, metal complex azo, anthraquinone, formazan, phthalocyanine or dioxazine dye, can contain the substituents customary in organic dyes bonded to its basic structure.

Examples of substituents in the radical $A_1$ are: alkyl groups having 1 to 4 carbon atoms, such as methyl, ethyl, propyl, isopropyl or butyl, it being possible for the alkyl radicals to be further substituted, for example by hydroxyl, sulfo or sulfato; alkoxy groups having 1 to 4 carbon atoms, such as methoxy, ethoxy, propoxy, isopropoxy or butoxy, it being possible for the alkyl radical to be further substituted, for example by hydroxyl, sulfo or sulfato; phenyl which is unsubstituted or substituted by $C_1$–$C_4$alkyl, $C_1$–$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$alkyl, $C_1$–$C_4$alkoxy, halogen or sulfo; phenylamino which is unsubstituted or substituted in the phenyl ring by $C_1$–$C_4$alkyl, $C_1$–$C_4$alkoxy, halogen or sulfo; N,N-di-β-hydroxyethylamino; N,N-di-β-sulfatoethylamino; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; sulfamoyl; N-mono- or N,N-dialkylsulfamoyl having in each case 1 to 4 carbon atoms; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo.

$A_1$ as a radical of a polyazo dye is suitably, in particular, a radical of a disazo dye, preferably a radical of the formula

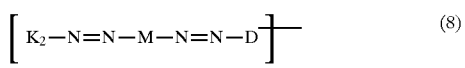

in which D is a radical of the benzene or naphthalene series,

M is the radical of a central component of the benzene or naphthalene series and $K_2$ is a radical of the benzene or naphthalene series or a heterocyclic radical.

The radical $K_2$ here is as defined and preferred above for $K_1$.

Examples of substituents of the radicals D and M are the following:

$C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, such as methoxy, ethoxy, propoxy, isopropoxy, butoxy, isobutoxy, sec-butoxy or tert-butoxy; $C_2$–$C_6$alkanoylamino, in particular $C_2$–$C_4$alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$–$C_4$alkylamino. In this case, the phenyl radicals mentioned can be unsubstituted or substituted, for example by $C_1$–$C_4$alkyl, $C_1$–$C_4$alkoxy, $C_2$–$C_4$alkanoylamino, ureido, halogen, carboxyl or sulfo.

Preferred substituents of the radicals D and M are $C_1$–$C_4$alkyl, $C_1$–$C_4$alkoxy, $C_2$–$C_4$alkanoylamino, halogen, hydroxyl, cyano, carbamoyl, carboxyl, sulfo, amino or N-mono- or N,N-di-$C_1$–$C_4$alkylamino. Particularly preferred substituents of the radicals D and M are $C_1$–$C_4$alkyl, $C_1$–$C_4$alkoxy, $C_2$–$C_4$alkanoylamino, halogen, hydroxyl, sulfo, amino or N-mono- or N,N-di-$C_1$–$C_4$alkylamino.

Particularly preferred radicals $A_1$ of a disazo dye are radicals of the formula

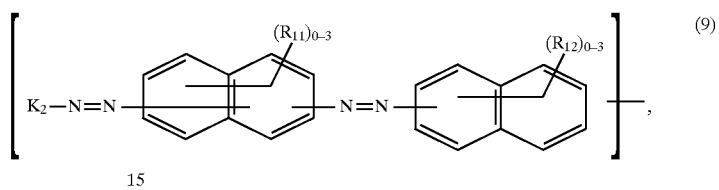

in which $K_2$ is as defined and preferred above and $(R_{11})_{0-3}$ and $(R_{12})_{0-3}$ independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino. $(R_{11})_{0-3}$ and $(R_{12})_{0-3}$ preferably independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, sulfo, amino and N-mono- or N,N-di-$C_1$–$C_4$alkylamino. $(R_{11})_{0-3}$ and $(R_{12})_{0-3}$ especially preferably independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, sulfo and amino.

Especially preferred radicals $A_1$ of a disazo dye are radicals of the formula

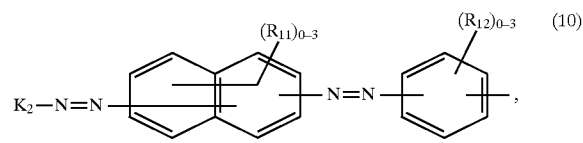

in which $K_2$, $(R_{11})_{0-3}$ and $(R_{12})_{0-3}$ are as defined and preferred above.

$A_1$ as a radical of an anthraquinone dye is suitably, in particular, a radical of the formula

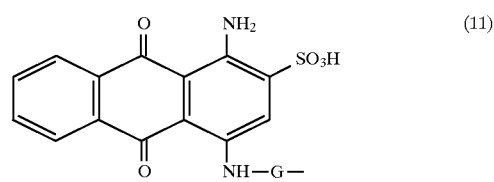

in which G is a phenylene radical which is unsubstituted or substituted by $C_1$–$C_4$alkyl, $C_1$–$C_4$alkoxy, halogen, carboxyl or sulfo, or a cyclohexylene, phenylenemethylene or $C_2$–$C_6$alkylene radical.

G is preferably a phenylene radical which is unsubstituted or substituted by $C_1$–$C_4$alkyl, $C_1$–$C_4$alkoxy, halogen, carboxyl or sulfo, in particular by $C_1$–$C_4$alkyl or sulfo.

Particularly important radicals $A_1$ of an anthraquinone dye are those of the formula

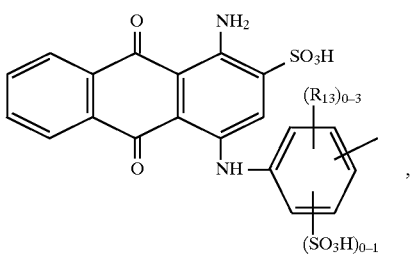

(12)

in which $(R_{13})_{0-3}$ is 0 to 3 identical or different substituents chosen from the group consisting of $C_1$–$C_4$alkyl, $C_1$–$C_4$alkoxy, halogen, carboxyl and sulfo. $R_{13}$ here is particularly preferably $C_1$–$C_4$alkyl, in particular methyl. The radical of the formula (12) preferably contains two sulfo groups.

The radical $A_1$ is preferably a radical of the formula (3) or the radical of a disazo or anthraquinone dye, these radicals mentioned being as defined and preferred above.

Preferred dyes of the formula (1) are those in which $A_1$ is a radical of the formula (3), (9) or (11). $K_1$ and $K_2$ here are preferably radicals of the formula (5) or (6), in particular radicals of the formula (5) or (7). The radicals $R_1$, $R_2$, $X_1$ and $Y_1$ here are as defined and preferred above.

Particularly preferred dyes of the formula (1) are those in which $A_1$ is a radical of the formula (4), (9) or (11). $K_1$ and $K_2$ here are preferably radicals of the formula (5) or (6), in particular radicals of the formula (5) or (7). The radicals $R_1$, $R_2$, $X_1$ and $Y_1$ here are as defined and preferred above.

Especially preferred dyes of the formula (1) are those in which $A_1$ is a radical of the formula (4), (10) or (12). $K_1$ and $K_2$ here are preferably radicals of the formula (5) or (6), in particular radicals of the formula (5) or (7). The radicals $R_1$, $R_2$, $X_1$ and $Y_1$ here are as defined and preferred above.

The present invention furthermore relates to a process for the preparation of the dyes of the formula (1), which comprises reacting a cyanuric halide, in particular cyanuric fluoride, or, preferably, cyanuric chloride, with a compound of the formula $$A_1\text{—NHR}_1 \qquad (13),$$

a compound of the formula $$X_1\text{—NHR}_2 \qquad (14)$$

and a compound of the formula $$Y_1\text{—H} \qquad (15)$$

and, if desired, subsequently carrying out a conversion reaction, in which $A_1$, $X_1$, $Y_1$, $R_1$ and $R_2$ are as defined under formula (1).

Preferably, the cyanuric halide is first reacted with approximately stoichiometric amounts of a compound of the formula (13) at a temperature of –5° to 20° C., preferably 0° to 5° C., the pH being kept neutral to acid, preferably at 2 to 7, in particular 2 to 4, by addition of suitable bases, for example alkali metal bases, such as lithium hydroxide or carbonate, sodium hydroxide or carbonate or potassium hydroxide or carbonate. Approximately stoichiometric amounts of a compound of the formula (14) are advantageously added to the resulting reaction mixture, and this compound is reacted with the triazine derivative at slightly elevated temperature, preferably at 10° to 60° C., in particular 15° to 30° C., and at a neutral to slightly acid pH, which is preferably 6 to 7.

Another possibility comprises first reacting the cyanuric halide with an intermediate of the compound of the formula (13), for example a diazo component in the case of azo dye radicals, and then reacting the product to give the corresponding dye radical $A_1$, for example by diazotization and coupling. This reaction to give a dye radical can be carried out, for example, preferably directly after the reaction of the cyanuric halide with the intermediate, or also during the subsequent course of the synthesis of the dye of the formula (1).

The triazinyl compounds obtainable by the processes described above still contain a halogen atom, which can be converted into a group $Y_1$ by reaction with a compound of the formula (15) at elevated temperature, preferably 20° to 70° C., and at a neutral to slightly alkaline pH, which is, for example, 7 to 9, depending on the compound of the formula (15) employed. An excess of the compound of the formula (15) is advantageously employed.

A conversion reaction is suitably, in particular, an acylation reaction, in which a radical $W_1$ of the formula —CO—R is introduced.

The procedure here is as described above, using a compound of the formula (15) in which $W_1$ is hydrogen. The resulting reaction product is then reacted with a compound of the formula $$\text{Hal—CO—R} \qquad (16)$$

in which Hal is halogen, in particular bromine or chlorine, and

R is as defined above.

Acetic anhydride is preferably used for introduction of a radical of the formula —CO—R is which R is methyl.

The reaction with compounds of the formula (16) defined above can generally be carried out in dipolar aprotic solvents, for example dimethylformamide, dimethyl sulfoxide or N-methylpyrrolidone, in the presence of a base, for example an alkali metal carbonate or alkali metal hydroxide, for example sodium carbonate, potassium carbonate or sodium hydroxide, at a temperature of, for example, 30° to 80° C.

The reaction with acetic anhydride is as a rule carried cut in an aqueous medium in the presence of a base, for example an alkali metal carbonate or alkali metal hydroxide, for example sodium carbonate, potassium carbonate or sodium hydroxide, at a temperature of, for example, 20° to 60° C., in particular 30° to 50° C., and a pH of, for example, 4 to 7, in particular 5 to 6.

The compounds employed in the above processes are known or can be obtained analogously to known compounds.

The dyes of the formula (1) are present either in the form of their free acid or, preferably, as salts thereof.

Suitable salts are, for example, the alkali metal, alkaline earth metal or ammonium salts or the salts of an organic amine. Examples are the sodium, lithium, potassium or ammonium salts or the salt of mono-, di- or triethanolamine.

The term sulfo generally includes the free acid form (—$SO_3H$) and also the salt form.

The dyes of the formula (1) are anionic acid dyes. In the dyes of the formula (1), the number of anionic groups, in particular the numer of sulfo groups, is greater than or equal to the number of cationic groups. Preferably, the numner of anionic groups is greater than the number of cationic groups. Cationic groups are to be understood as meaning those which carry a cationic charge under the customary dyeing conditions. Examples are aliphatically bonded amino radicals. The nitrogen atoms present in the triazine ring and those bonded to the triazine radical carry no cationic charge.

The total number of sulfo and sulfato groups of the dyes of the formula (1) is preferably greater than one. The total number of sulfo and sulfato groups of the dyes of the formula (1) is preferably two to four, in particular two or three, and preferably two.

The dyes of the formula (1) according to the invention are suitable, by methods known per se, for dyeing and printing, in particular fibre materials containing nitrogen or containing hydroxyl groups, for example textile fibre materials of cellulose, silk and, in particular, wool and synthetic polyamides. Dyeing or printing of natural or synthetic polyamide fibre materials is preferred. The dyes of the formula (1) according to the invention can be used for dyeing and printing in the generally customary form, which is worked up beforehand, if appropriate. Level dyeings with good allround fastness properties, in particular good fastness to rubbing, wet processing, wet rubbing and light. The dyes according to the invention are furthermore readily water-soluble and can easily be combined with other dyes. The dyes according to the invention in which $W_1$ is hydrogen are furthermore particularly suitable for dyeing in the presence of colourless fixing agents which contain sulfo or sulfato groups and contain at least two fibre-reactive groups. Dyeings with improved wet fastness properties are obtained here, the dyeings likewise having a very good levelness. The abovementioned textile material can be in the most diverse forms of processing, for example as fibre, yarn, woven fabric or knitted fabric.

The following examples serve to illustrate the invention. The temperatures are stated in degrees Celsius, parts are parts by weight and the percentage data are based on percentages by weight, unless noted otherwise. Parts by weight bear the same relation to parts by volume as the kilogramme to the litre.

EXAMPLE 1

19.1 parts of 1,3-phenylenediamine-4-sulfonic acid (98.6%) are dissolved in 100 parts of water and 52 parts of an aqueous, 2 normal sodium hydroxide solution at a pH of 7, and the mixture is added dropwise to a mixture comprising 18.5 parts of cyanuric chloride, 100 parts of ice and 50 parts of water at a temperature of 5° C. in the course of 50 minutes. During this dropwise addition, the pH is kept at a value of 3 to 3.5. The pH is then increased to 7 in the course of 70 minutes with 50 parts of an aqueous 2 normal sodium hydroxide solution. After one hour, 25 parts of hydrochloric acid (37%) and 200 parts of water are added, and 25 parts of an aqueous 4 molar sodium nitrite solution are metered in at a temperature of 5 to 15° C. in the course of 25 minutes. After two hours, the excess sodium nitrite is destroyed with sulfamic acid. During this procedure, 22.5 parts of 2-naphthylamine-5-sulfonic acid are dissolved in 100 parts of water and 52 parts of an aqueous 2 normal sodium hydroxide solution at a pH of 7 and the solution is added dropwise to the reaction mixture in the course of 30 minutes. Thereafter, the pH is brought to a value of 7 in the course of 80 minutes by means of 112 parts of an aqueous 2 normal sodium hydroxide solution. A solution of 12.2 parts of N-ethylaniline in 100 parts of 1 molar hydrochloric acid is then added dropwise in the course of 15 minutes, followed by the addition of 101 parts of an aqueous 2 normal sodium hydroxide solution in the course of 50 minutes. 500 parts of an aqueous sodium chloride solution are added to the dark red reaction solution and the product which has precipitated out is filtered off, washed with 10% aqueous sodium chloride solution and dried in vacuo at a temperature of 70° C. 52.5 parts of an intermediate compound of the formula

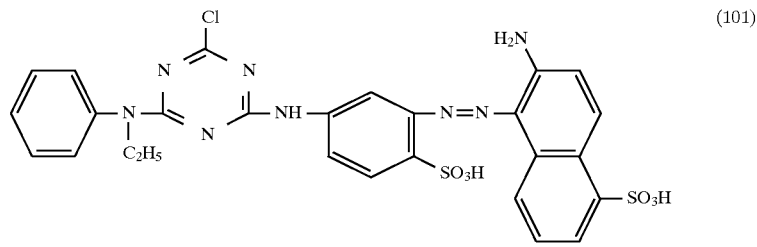

are obtained.

10 parts of the intermediate of the formula (101) are dissolved in 200 parts of water and the solution is added dropwise to a solution of 14 parts of 3-methylaminopropylamine in 14 parts of water at a temperature of 40° C. in the course of 4 hours. The mixture is subsequently stirred at a temperature of 40° C. for one hour and 25 parts of hydrochloric acid are then added. The product which has precipitated out is filtered off and washed with water. The moist material on the suction filter is introduced into 300 parts of water at a temperature of 70° C. and neutralized with 10 parts of an aqueous 1 normal sodium hydroxide solution. The product is salted out with 30 parts of sodium chloride, filtered off at a temperature of 40° C. and dried in vacuo at a temperature of 50° C. 8.8 parts of a dye which, in the form of the free acid, is the compound of the formula

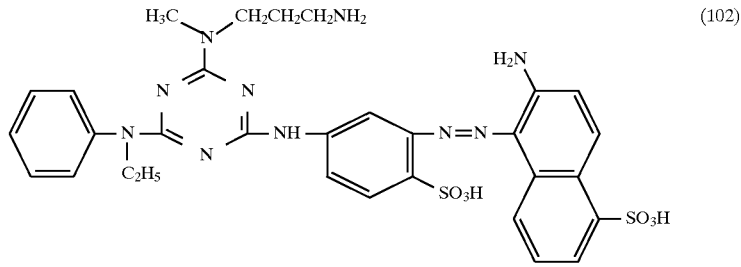

are obtained. The resulting dye of the formula (102) dyes wool and synthetic polyamide fibre material in orange colour shades.

EXAMPLES 2 TO 25

The dyes shown in the form of the free acids in the following Table 1, which dye wool and synthetic polyamide fibre material in the colour shades shown in column 3, can be obtained in a manner analogous to the instructions in Example 1.

TABLE 1

| Example | Dye | | Colour shade on wool and polyamide |
|---|---|---|---|
| 2 | [structure with pyrazole, azo, triazine with N(CH$_3$)CH$_2$CH$_2$CH$_2$NH$_2$ and N-phenyl-C$_2$H$_5$ groups, phenyl-SO$_3$H substituent] | (103) | yellow |
| 3 | [structure with 2,5-dichlorophenyl-SO$_3$H substituent on pyrazole] | (104) | yellow |
| 4 | [structure with 2-chlorophenyl-SO$_3$H substituent on pyrazole] | (105) | yellow |
| 5 | [structure with OH on pyrazole instead of NH$_2$, with NHCH$_2$CH$_2$NH$_2$ group on triazine, 2,5-dichlorophenyl-SO$_3$H substituent] | (106) | yellow |

TABLE 1-continued

| Example | Dye | | Colour shade on wool and polyamide |
|---|---|---|---|
| 6 | [structure] | (107) | yellow |
| 7 | [structure] | (108) | yellow |
| 8 | [structure] | (109) | orange |
| 9 | [structure] | (110) | orange |
| 10 | [structure] | (111) | red |

TABLE 1-continued
| Example | Dye | | Colour shade on wool and polyamide |
|---|---|---|---|
| 11 | 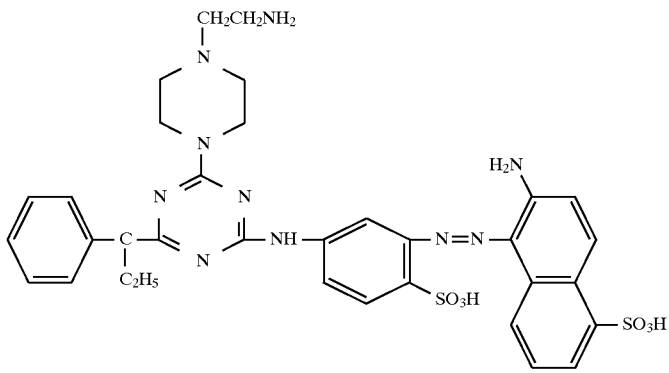 | (112) | orange |
| 12 | 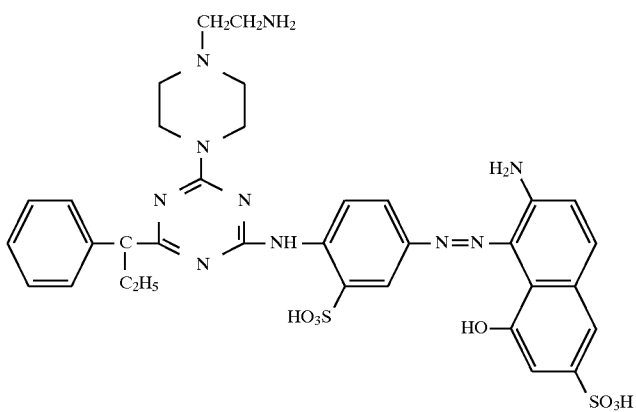 | (113) | red |
| 13 | 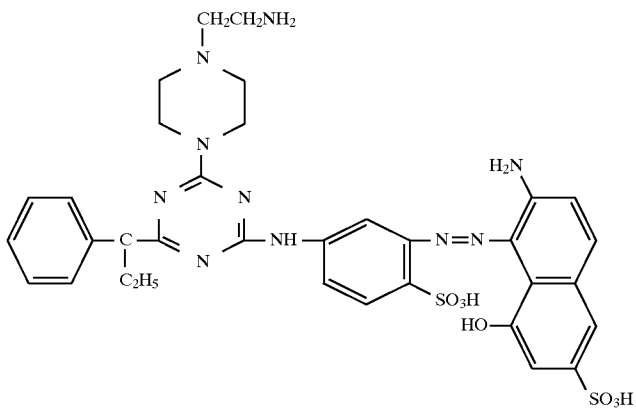 | (114) | red |

TABLE 1-continued

| Example | Dye | | Colour shade on wool and polyamide |
|---|---|---|---|
| 14 | [structure] | (115) | red |
| 15 | [structure] | (116) | red |
| 16 | [structure] | (117) | red |
| 17 | [structure] | (118) | red |

TABLE 1-continued

| Example | Dye | | Colour shade on wool and polyamide |
|---|---|---|---|
| 18 | [structure] | (119) | red |
| 19 | [structure] | (120) | blue |
| 20 | [structure] | (121) | blue |
| 21 | [structure] | (122) | blue |

TABLE 1-continued
| Example | Dye | | Colour shade on wool and polyamide |
|---|---|---|---|
| 22 | 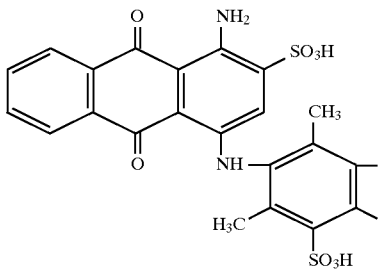 | (123) | blue |
| 23 | 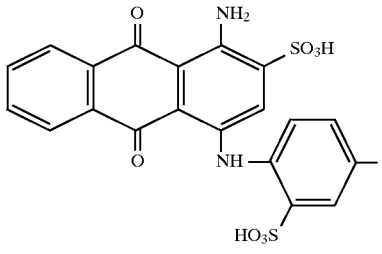 | (124) | blue |
| 24 | 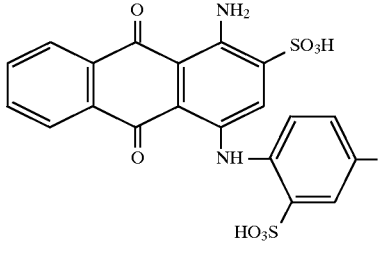 | (125) | blue |
| 25 | 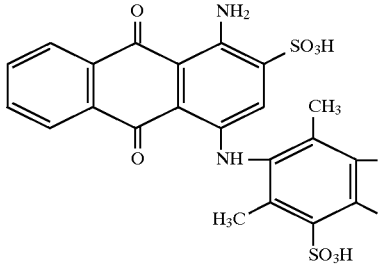 | (126) | blue |

EXAMPLES 26

6.5 Parts of the dye of the formula

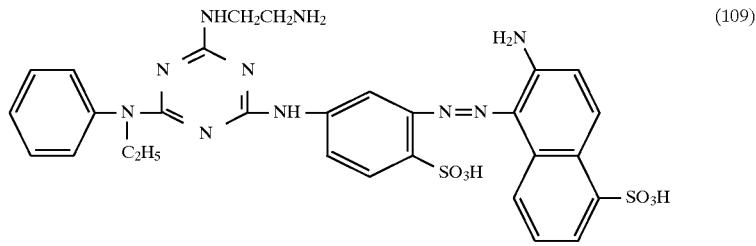
(109)

are dissolved in 100 parts of water and 10 parts of dioxane at a temperature of 35° to 40° C. and a pH of 6, the pH being established by means of hydrochloric acid (37%). 6 parts of acetic anhydride are added dropwise in the course of 30 minutes, the pH being kept at a value between 5 and 6 by means of 1 molar aqueous sodium carbonate solution. The reaction solution is evaporated and the residue is dried in vacuo at a temperature of 70° C. A dye which, in the form of the free acid, is the compound of the formula

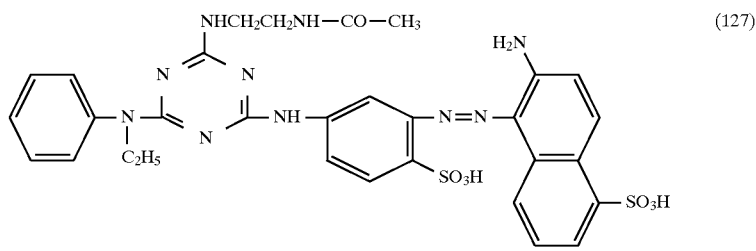
(127)

is obtained. The dye of the formula (127) dyes wool and synthetic polyamide fibre material in orange colour shades.

EXAMPLES 27 TO 50

The dyes shown in the form of the free acids in the following Table 2, which dye wool and synthetic polyamide fibre material in the colour shades shown in column 3, can be obtained in an analogous manner to the instructions in Example 26.

TABLE 2

| Example | Dye | | Colour shade on wool and polyamide |
|---|---|---|---|
| 27 | 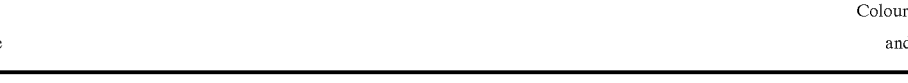 | (128) | yellow |

TABLE 2-continued

| Example | Dye | | Colour shade on wool and polyamide |
|---|---|---|---|
| 28 | [structure] | (129) | yellow |
| 29 | [structure] | (130) | yellow |
| 30 | [structure] | (131) | yellow |
| 31 | [structure] | (132) | yellow |
| 32 | [structure] | (133) | yellow |

TABLE 2-continued
| Example | Dye | | Colour shade on wool and polyamide |
|---|---|---|---|
| 33 | 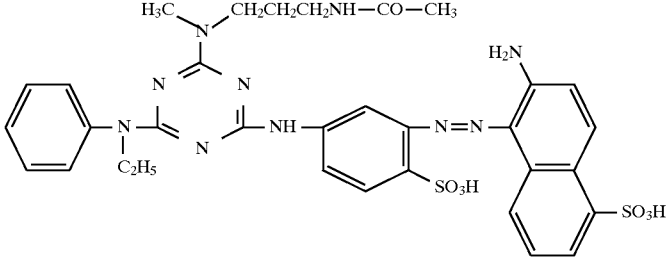 | (134) | orange |
| 34 | 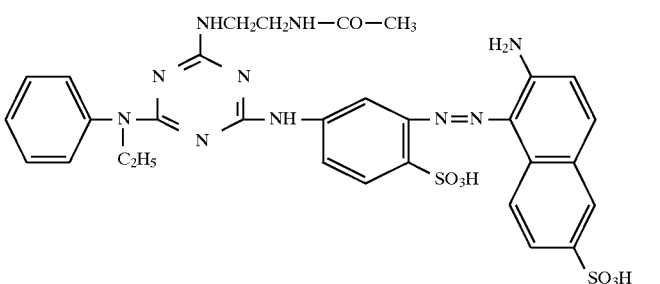 | (135) | orange |
| 35 | 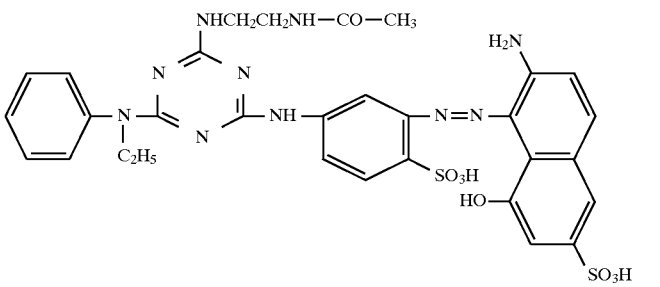 | (136) | red |
| 36 | 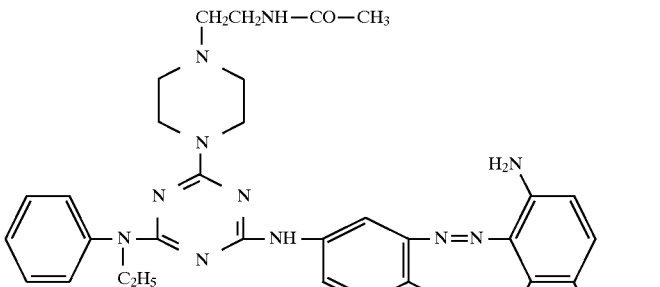 | (137) | orange |

TABLE 2-continued

| Example | Dye | | Colour shade on wool and polyamide |
|---|---|---|---|
| 37 | [structure] | (138) | red |
| 38 | [structure] | (139) | red |
| 39 | [structure] | (140) | red |

TABLE 2-continued

| Example | Dye | | Colour shade on wool and polyamide |
|---|---|---|---|
| 40 | [structure] | (141) | red |
| 41 | [structure] | (142) | red |
| 42 | [structure] | (143) | red |
| 43 | [structure] | (144) | red |
| 44 | [structure] | (145) | blue |

TABLE 2-continued

| Example | Dye | | Colour shade on wool and polyamide |
|---|---|---|---|
| 45 | [anthraquinone dye structure] | (146) | blue |
| 46 | [anthraquinone dye structure] | (147) | blue |
| 47 | [anthraquinone dye structure] | (148) | blue |
| 48 | [anthraquinone dye structure] | (149) | blue |
| 49 | [anthraquinone dye structure] | (150) | blue |

TABLE 2-continued

| Example | Dye | | Colour shade on wool and polyamide |
|---|---|---|---|
| 50 | 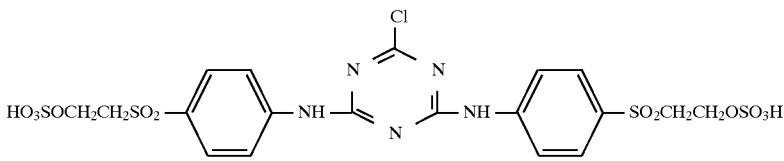 | (151) | blue |

Dyeing Example 1

100 Parts of a woollen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye of the formula (102), the dye liquor is kept at a temperature of 30° C. for a further 5 minutes and then heated to a temperature of 100° C. at a heating-up rate of 1.5° C. per minute. Dyeing is carried out at this temperature for 60 minutes, the bath is then cooled to 50° C. and the dye liquor is drained off. The woollen fabric, which has been dyed in an orange colour shade, is rinsed and dried in the customary manner.

Dyeing Example 2

100 Parts of a woollen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye of the formula (102) and 2 parts of the fixing agent of the formula

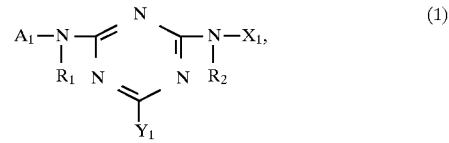

(152)

the dye liquor is kept at a temperature of 30° C. for a further 5 minutes and then heated to a temperature of 100° C. at a heating-up rate of 1.5° C. per minute. Dyeing is carried out at this temperature for 40 minutes, 15 parts of disodium hydrogen phosphate are added and dyeing is continued at a pH of 7 for a further 40 minutes. The bath is then cooled to 50° C. and the dye liquor is drained off. The woollen fabric, which has been dyed in an orange colour shade, is rinsed and dried. The resulting dyeing is level and has very good wet fastness properties.

What is claimed is:

1. An anionic acid dye of the formula $$A_1-N-\overset{\overset{N}{\|}}{\underset{\underset{N}{|}}{C}}-\overset{\overset{N}{\|}}{\underset{\underset{N}{|}}{C}}-N-X_1, \qquad (1)$$
$$\underset{Y_1}{|}$$

in which $R_1$ is hydrogen or $C_1$–$C_4$alkyl which is unsubstituted or substituted by hydroxyl, sulfo, sulfato, cyano or carboxyl, $R_2$ is $C_1$–$C_4$alkyl, $X_1$ is $C_1$–$C_8$alkyl, $C_5$–$C_7$cycloalkyl which is unsubstituted or substituted by $C_1$–$C_4$alkyl, or phenyl which is unsubstituted or substituted by $C_1$–$C_4$alkyl, $C_1$–$C_4$alkoxy, $C_2$–$C_4$alkanoylamino, ureido, halogen or carboxyl, or naphthyl which is unsubstituted or substituted by $C_1$–$C_4$alkyl, $C_1$–$C_4$alkoxy, $C_2$–$C_4$alkanoylamino, ureido, halogen, carboxyl or sulfo, or the radical of the formula —N($R_2$)—$X_1$ is a ring, which may contain further heteroatoms, $Y_1$ is a radical of the formula

 (2a)

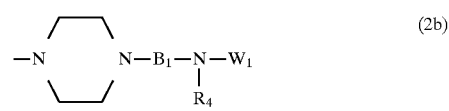 (2b)

or

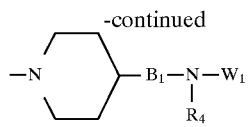

(2c)

in which

B$_1$ is C$_1$–C$_{12}$alkylene which can be interrupted by 1, 2 or 3 members from the group consisting of —NH—, —N(CH$_3$)— and —O— and is unsubstituted or substituted by hydroxyl, sulfo, sulfato, cyano or carboxyl, or C$_5$–C$_7$cycloalkylene which is unsubstituted or substituted by C$_1$–C$_4$alkyl, phenylene, or naphthylene which are unsubstituted or substituted by C$_1$–C$_4$alkyl, C$_1$–C$_4$alkoxy, C$_2$C$_4$alkanoylamino, amino, hydroxyl, ureido, halogen, carboxyl or sulfo, R$_3$ is hydrogen or C$_1$–C$_4$alkyl and R$_4$ is hydrogen or C$_1$–C$_4$alkyl which is unsubstituted or substituted by hydroxyl, sulfo, sulfato, cyano or carboxyl, W$_1$ is hydrogen or a radical of the formula —CO—R, in which

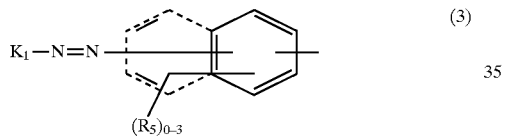

R is C$_1$–C$_8$alkyl, or phenyl which is unsubstituted or substituted by C$_1$–C$_4$alkyl, C$_1$–C$_4$alkoxy, halogen, carboxyl or sulfo and A$_1$ is the radical of a monoazo dye of the formula (3)

in which

K$_1$ is a radical of the benzene or naphthalene series or a heterocyclic radical and (R$_5$)$_{0-3}$ is 0 to 3 identical or different substituents chosen from the group consisting of C$_1$–C$_4$alkyl, C$_1$–C$_4$alkoxy, C$_2$–C$_4$alkanoylamino, ureido, halogen, carboxyl and sulfo, or A$_1$ is the radical of a polyazo, metal complex azo, anthraquinone, formazan, phthalocyanine or dioxazine dye.

2. An anionic acid dye according to claim 1, wherein R$_1$ is hydrogen or C$_1$–C$_4$alkyl.

3. An anionic acid dye according to claim 1, wherein X$_1$ is phenyl which is unsubstituted or substituted by C$_1$–C$_4$alkyl, C$_1$–C$_4$alkoxy, C$_2$–C$_4$-alkanoylamino, ureido, halogen or carboxyl.

4. An anionic acid dye according to claim 1, wherein B$_1$ is a C$_1$–C$_{10}$alkylene radical which can be interrupted by 1, 2 or 3 members from the group consisting of —NH—, —N(CH$_3$)— and —O— and is unsubstituted or substituted by hydroxyl, sulfo, sulfato, cyano or carboxyl.

5. An anionic acid dye according to claim 1, wherein R$_4$ is hydrogen or C$_1$–C$_4$alkyl.

6. An anionic acid dye according to claim 1, wherein W$_1$ is hydrogen.

7. An anionic acid dye according to claim 1, wherein R$_1$, R$_3$ and R$_4$ independently of one another are hydrogen or C$_1$–C$_4$alkyl, R$_2$ is C$_1$–C$_4$alkyl, X$_1$ is phenyl which is unsubstituted or substituted by C$_1$–C$_4$alkyl, C$_1$–C$_4$alkoxy, C$_2$–C$_4$alkanoylamino, ureido, halogen, carboxyl or sulfo, B$_1$ is a C$_1$–C$_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl and W$_1$ is hydrogen.

8. An anionic acid dye according to claim 1, wherein A$_1$ is a radical of the formula (3) or the radical of a disazo or anthraquinone dye.

9. An anionic acid dye according to claim 1, wherein A$_1$ is a radical of the formula (3) or a radical of the formula

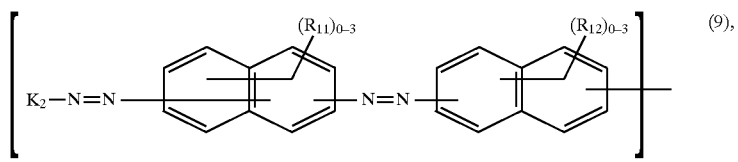

(9), in which (R$_{11}$)$_{0-3}$ and (R$_{12}$)$_{0-3}$ independently of one another are 0 to 3 identical or different substituents chosen from the group consisting of C$_1$–C$_4$alkyl, C$_1$–C$_4$alkoxy, C$_2$–C$_4$alkanoylamino, halogen, hydroxyl, cyano, carbamoyl, carboxyl, sulfo, amino and N-mono- or N,N-di-C$_1$–C$_4$alkylamino, and K$_2$ is a radical of the benzene or naphthalene series or a heterocyclic radical, or A$_1$ is a radical of the formula

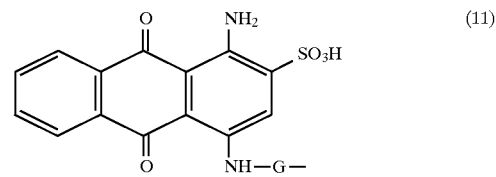

(11)

in which G is a phenylene radical which is unsubstituted or substituted by C$_1$–C$_4$alkyl, C$_1$–C$_4$alkoxy, halogen, carboxyl or sulfo, or a cyclohexylene, phenylenemethylene or C$_2$–C$_6$alkylene radical.

10. An anionic acid dye according to claim 1, wherein

A$_1$ is a radical of the formula

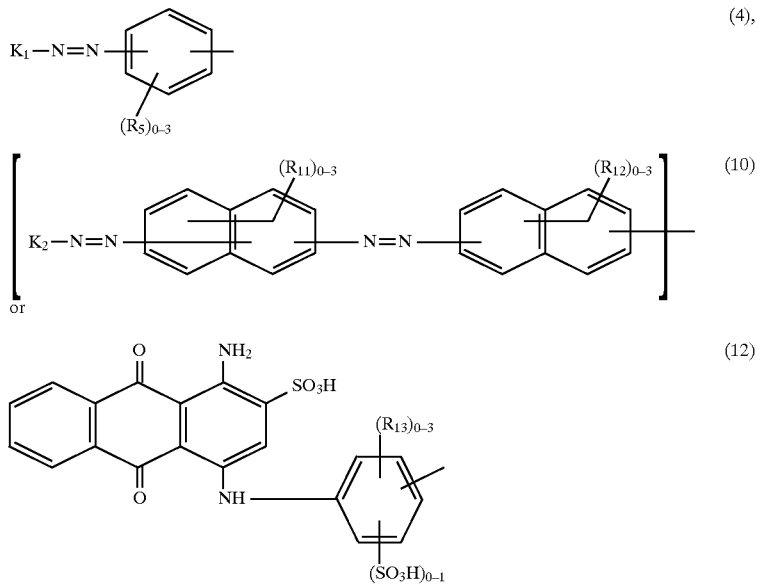

in which (R$_5$)$_{0-3}$ is 0 to 3 identical or different substituents chosen from the group consisting of C$_1$–C$_4$alkyl, C$_1$–C$_4$alkoxy, halogen and sulfo, (R$_{11}$)$_{0-3}$ and (R$_{12}$)$_{0-3}$ independently of one another are 0 to 3 identical or different substituents chosen from the group consisting of C$_1$–C$_4$alkyl, C$_1$–C$_4$alkoxy, C$_2$–C$_4$alkanoylamino, halogen, hydroxyl, cyano, carbamoyl, carboxyl, sulfo, amino and N-mono- or N,N-di-C$_1$–C$_4$alkylamino, (R$_{13}$)$_{0-3}$ is 0 to 3 identical or different substituents chosen from the group consisting of C$_1$–C$_4$alkyl, C$_1$–C$_4$alkoxy, halogen, carboxyl and sulfo, and K$_1$ and K$_2$ independently of one another are a radical of the formula

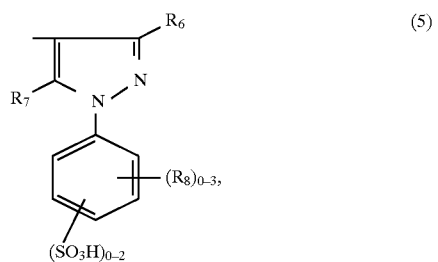

in which R$_6$ is methyl or carboxyl,

R$_7$ is amino or hydroxyl and (R$_8$)$_{0-3}$ is 0 to 3 identical or different substituents chosen from the group consisting of C$_1$–C$_4$alkyl, C$_1$–C$_4$alkoxy, C$_2$–C$_4$alkanoylamino, ureido, halogen, carboxyl and sulfo, or a radical of the formula

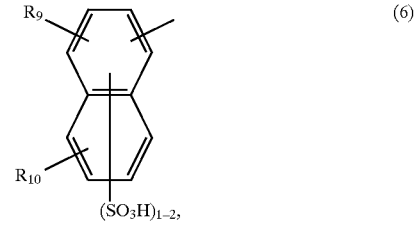

in which R$_9$ is hydrogen, amino or N-mono- or N,N-di-C$_1$–C$_4$alkylamino and R$_{10}$ is hydrogen or hydroxyl.

11. A process for the preparation of an anionic acid dye of formula (1) according to claim 1, which comprises reacting a cyanuric halide with a compound of the formula

A$_1$—NHR$_1$ (13), a compound of the formula

X$_1$—NHR$_2$ (14)

and a compound of the formula

Y$_1$—H (15)

and optionally subsequently carrying out a conversion reaction, where A$_1$, X$_1$, Y$_1$, R$_1$ and R$_2$ are as defined in claim 1.

12. A process for dyeing or printing hydroxyl group-containing or nitrogen group-containing fibre material, which process comprises applying to said fibre material a tinctorial amount of an anionic acid dye according to claim 1.

13. A process according to claim 12, wherein said fibre material is natural or synthetic polyamide fibre material.

* * * * *

UNITED STATES PATENT AND TRADEMARK OFFICE
CERTIFICATE OF CORRECTION

PATENT NO. : 5,859,216
DATED : JANUARY 12, 1999
INVENTOR(S) : JEAN-MARIE ADAM ET AL.

It is certified that error appears in the above-identified patent and that said Letters Patent is hereby corrected as shown below:

On the cover page, Item [54] should read:

-- [54] ANIONIC ACID DYES, PROCESSES FOR THEIR PREPARATION AND THEIR USE --.

Signed and Sealed this

Twentieth Day of July, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,859,216
DATED : JANUARY 12, 1999
INVENTOR(S) : JEAN-MARIE ADAM ET AL.

It is certified that error appears in the above-identified patent and that said Letters Patent is hereby corrected as shown below:

On the title page item [30], should read

-- [30]     Foreign Application Priority Data

Mar. 4, 1996 [CH]    Switzerland        560/96 --.

Signed and Sealed this

Seventeenth Day of August, 1999

Attest:

Q. TODD DICKINSON

Attesting Officer      Acting Commissioner of Patents and Trademarks